(12) United States Patent
Frank et al.

(10) Patent No.: US 7,536,171 B2
(45) Date of Patent: May 19, 2009

(54) SYSTEM FOR PROVIDING A CALL CENTER FOR RESPONSE TO ADVERTISEMENTS OVER A MEDIUM

(75) Inventors: Ervin Joseph Frank, Reno, NV (US); Clayton Abel Pippenger, Carson City, NV (US)

(73) Assignee: Teleads LLC, Reno, NV (US)

( * ) Notice: Subject to any disclaimer, the term of this patent is extended or adjusted under 35 U.S.C. 154(b) by 422 days.

(21) Appl. No.: 11/381,581

(22) Filed: May 4, 2006

(65) Prior Publication Data
US 2007/0274484 A1 Nov. 29, 2007

(51) Int. Cl.
*H04M 1/66* (2006.01)
(52) U.S. Cl. ...................... 455/410; 455/406
(58) Field of Classification Search ............ 379/265.01, 379/114.13, 211.02
See application file for complete search history.

(56) References Cited

U.S. PATENT DOCUMENTS

| | | | |
|---|---|---|---|
| 5,752,186 A * | 5/1998 | Malackowski et al. ... 455/414.1 |
| 6,842,767 B1 | 1/2005 | Partovi et al. | |
| 6,868,384 B2 | 3/2005 | Parus et al. | |
| 2002/0028665 A1 | 3/2002 | Mankovitz | |
| 2002/0035474 A1 | 3/2002 | Alpdemir | |
| 2002/0191762 A1 * | 12/2002 | Benson ...................... 379/133 |
| 2003/0220866 A1 * | 11/2003 | Pisaris-Henderson et al. . 705/37 |
| 2003/0223563 A1 * | 12/2003 | Wolmuth ............... 379/218.01 |
| 2004/0006478 A1 | 1/2004 | Alpdemir et al. | |
| 2005/0069103 A1 | 3/2005 | DiVenuta et al. | |
| 2006/0004641 A1 * | 1/2006 | Moore et al. .................. 705/26 |
| 2006/0094411 A1 * | 5/2006 | Dupont ........................ 455/417 |

* cited by examiner

*Primary Examiner*—Creighton Smith
(74) *Attorney, Agent, or Firm*—Lewis and Roca LLP

(57) ABSTRACT

A system for directing call from a user to a desired advertiser based upon a code in an advertisement. The system receives a call from a user. The user then inputs a code or password from the advertisement. The call is then forwarded to a desired advertiser based upon the input code. The advertiser is then billed for the call based on the type of call forwarded to the advertiser.

56 Claims, 7 Drawing Sheets

SYSTEM FOR PROVIDING A CALL CENTER FOR RESPONSE TO ADVERTISEMENTS OVER A MEDIUM

FIELD OF THE INVENTION

Figure 1:
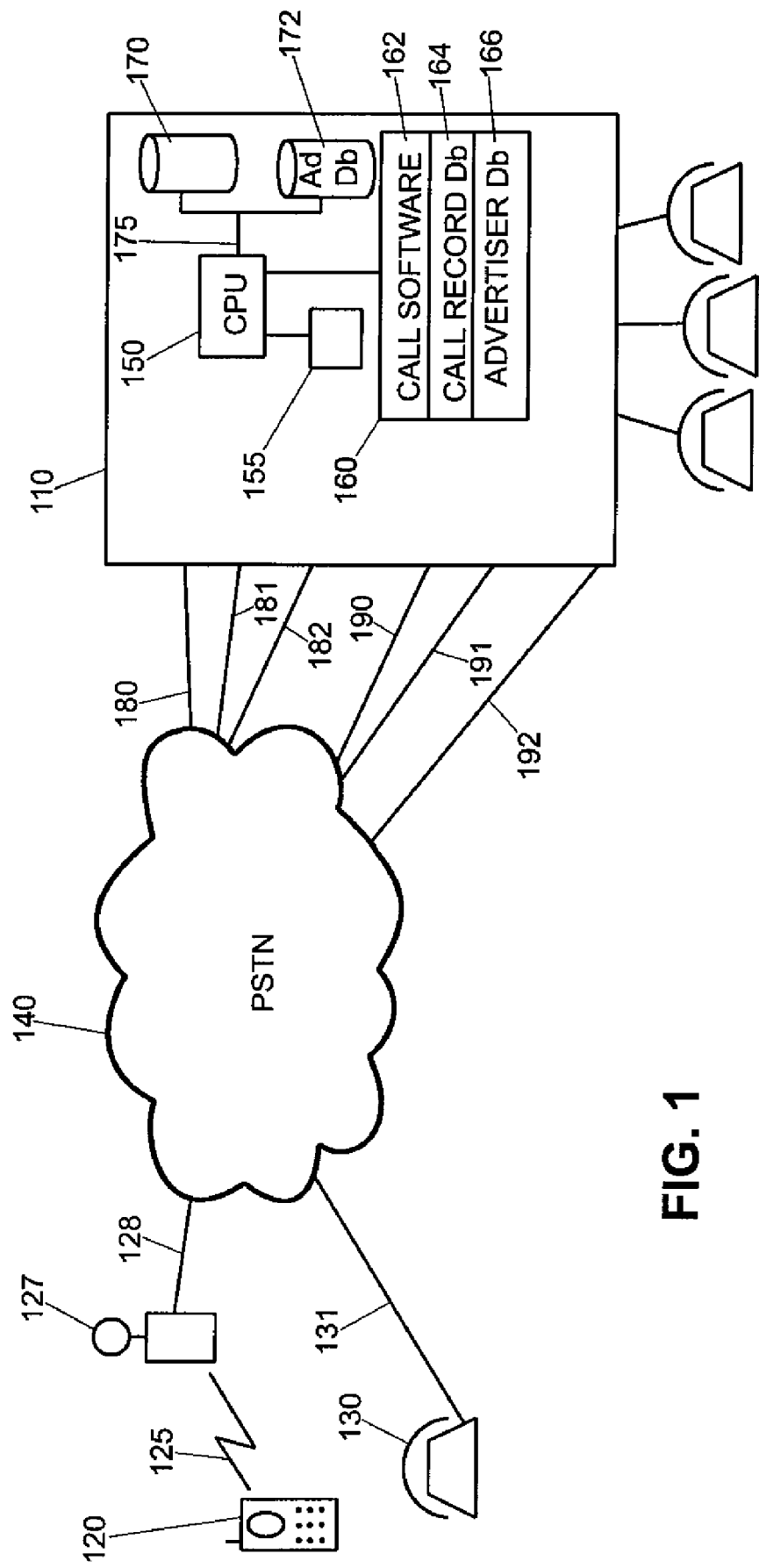

This invention relates to a system for allowing people using a media to respond to advertisements received over the media. More particularly, this invention relates to a system that receives a telephone call from a person and directs the call to an advertiser based upon a code or keyword from the advertisement. Still more particularly this invention relates to a system in which an advertiser is billed for a call received from a person based upon how the call is handled.

PRIOR ART

It is a problem for people to respond to advertisements received over certain types of media, such as, radio programming or roadside billboards. It often hard for the person to remember a telephone number of a particular advertiser. Furthermore, it is often a problem to find writing utensils to write the number down or to write the number down while performing another function such as driving.

It is a further problem for advertisers that in order to convey the information, such as a location or telephone number, the information must be constantly repeated to insure that a person gets the information correctly. This often means that an advertisement must last a longer duration, raising the cost of the advertisement.

Thus, it preferable to provide a person having heard or seen the advertisement with a keyword or code for use in a system that provides one number for advertisements. This is common in the art. However, it is a problem for a provider of such a service to bill an advertiser for such a call. It is a particular problem that some advertisers may refer a caller to an 800 number for a call center while other advertisers may refer the callers to a local number of a local retailer and/or service provider. These two situations are handled differently. When a call is transferred to an 800 number, the call is "flashed" over to the 800 number and the call to the service provider is ended. When the call is transferred to a local number of a retailer and/or service provider, the call is held by the service provider and is transferred to the local number. In this instance, the line receiving the call must remain connected and a second line must be connected to the local number. Both lines then remain connected until the call to the local number is completed. This uses more of the service providers limited resources. Thus, service providers are constantly striving to find a way to bill advertisers using the service based upon the amount of resources used.

SUMMARY OF THE INVENTION

The above and other problems are solved and an advance in the art is made by a system for providing a call center for advertisements in accordance with this invention. One advantage of a system in accordance with this invention allows a person hearing an advertisement to only have to remember a keyword or other code to contact an advertiser. A second advantage of a system in accordance with this invention is that the system provides an efficient manner for billing an advertiser based upon the resources a call to the advertiser uses. A third advantage of a system in accordance with this invention is that demographic information of a user may be provided to an advertiser for use by the advertiser.

A system in accordance with this invention operates in the following manner. The system receives a call from the user. The systems then queries the user and receives a code for a desired advertiser that was seen and/or heard in an advertisement. A telephone number for the desired advertiser is then determined from the received code. The call is then transferred to the determined telephone number.

When transferring the call to the telephone number, the system determines whether the call to the advertiser is a toll or a toll free call. If the call to the advertiser is a toll free call, the call is flashed to the advertiser and the call from the user to system is terminated. The advertiser is then billed only for the amount of time the user is connected to the system. In some embodiments, a flat rate may be charge and in other embodiments an advertiser may be charged for the time a user is connected to the system.

If the call is transferred to a toll call, the call from the user is forwarded to the telephone number of the advertiser. The forwarding requires the system to hold the line connecting the user call and open a connection to the advertiser over a second call. The system must then maintain connections for both calls for the duration of the call to the advertiser. The advertiser is then billed a toll rate. The toll rate may include a fee for the time the connection for the call from the user is held as well as a fee for the time the connection for the call to the advertiser is held. In some embodiments, this may be a flat fee based upon the average time a call to the advertiser lasts.

In order to bill the advertiser, the system may time the length of a connection of the call from the user. In some embodiments, the timing is done by starting a timer when the call is received and stopping the timer when the connection for the call is terminated. In other embodiments, a start time and a stop time of the call may be recorded and used to calculate the length of the call.

In some embodiments, the system collects demographic information of the user making the call. This may be retrieved querying the user for the information. In other embodiments, the demographic information is collected in the following manner. First, a DID for the telephone calling is received as the call from the user is connected. The DID is then stored in a call record. The telephone number of the calling telephone is then determined from the DID. Demographic information for the user is then read from a database based upon the telephone number. This demographic information is then transmitted to the advertiser. The information for many calls may be delivered at one time or the information may be delivered immediately after the information is retrieved.

In some exemplary embodiments, a caller is transferred to a live operator when a desired advertiser cannot be determined from the input code. The operator then determines the desired advertiser and forwards the call properly.

In other exemplary embodiments, a call received from the user is placed on hold while the desired advertiser is connected. While the call is being held, advertisements may be played over the connection of the call.

BRIEF DESCRIPTION OF THE INVENTION

Figure 2A:
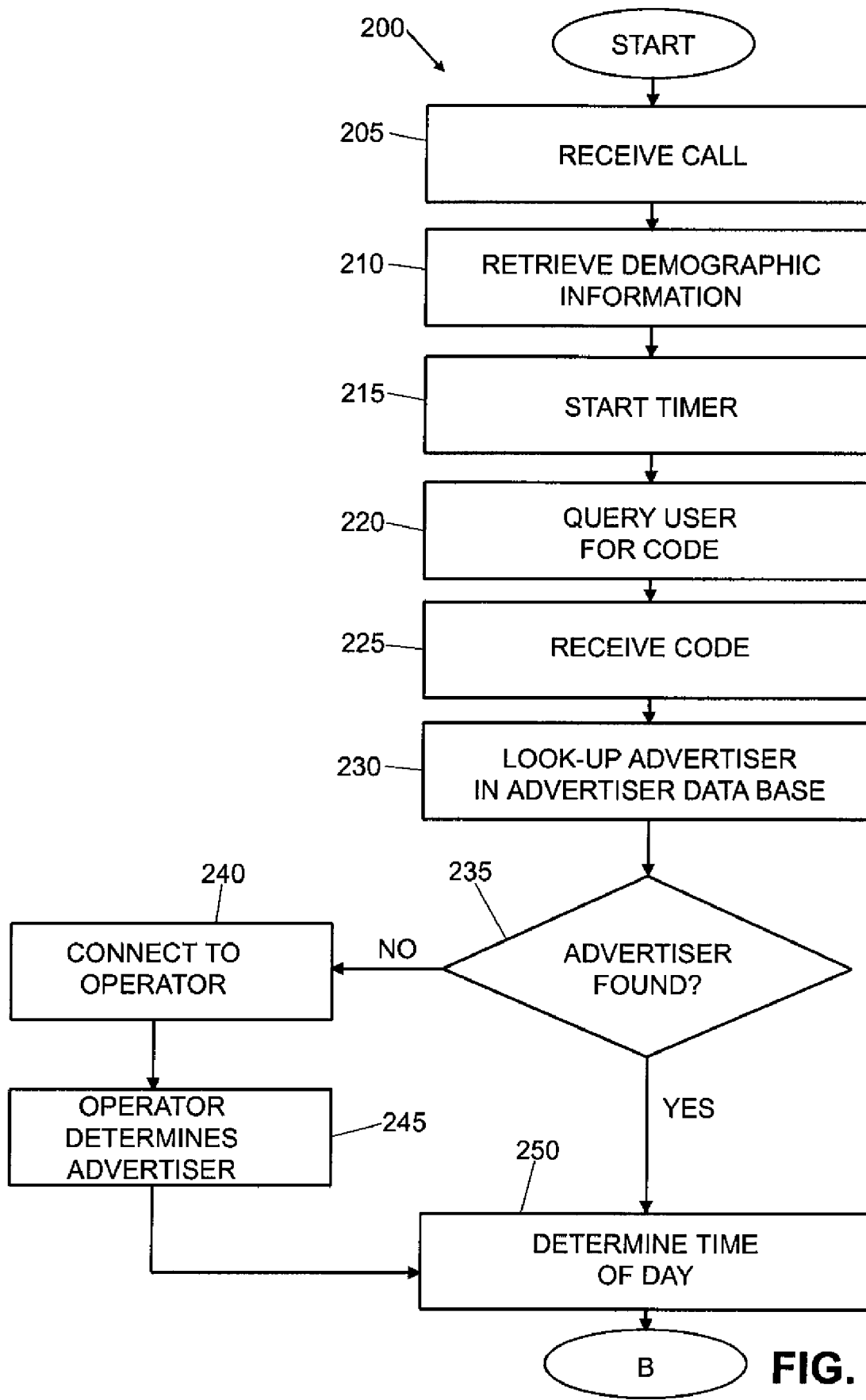
Figure 2B:
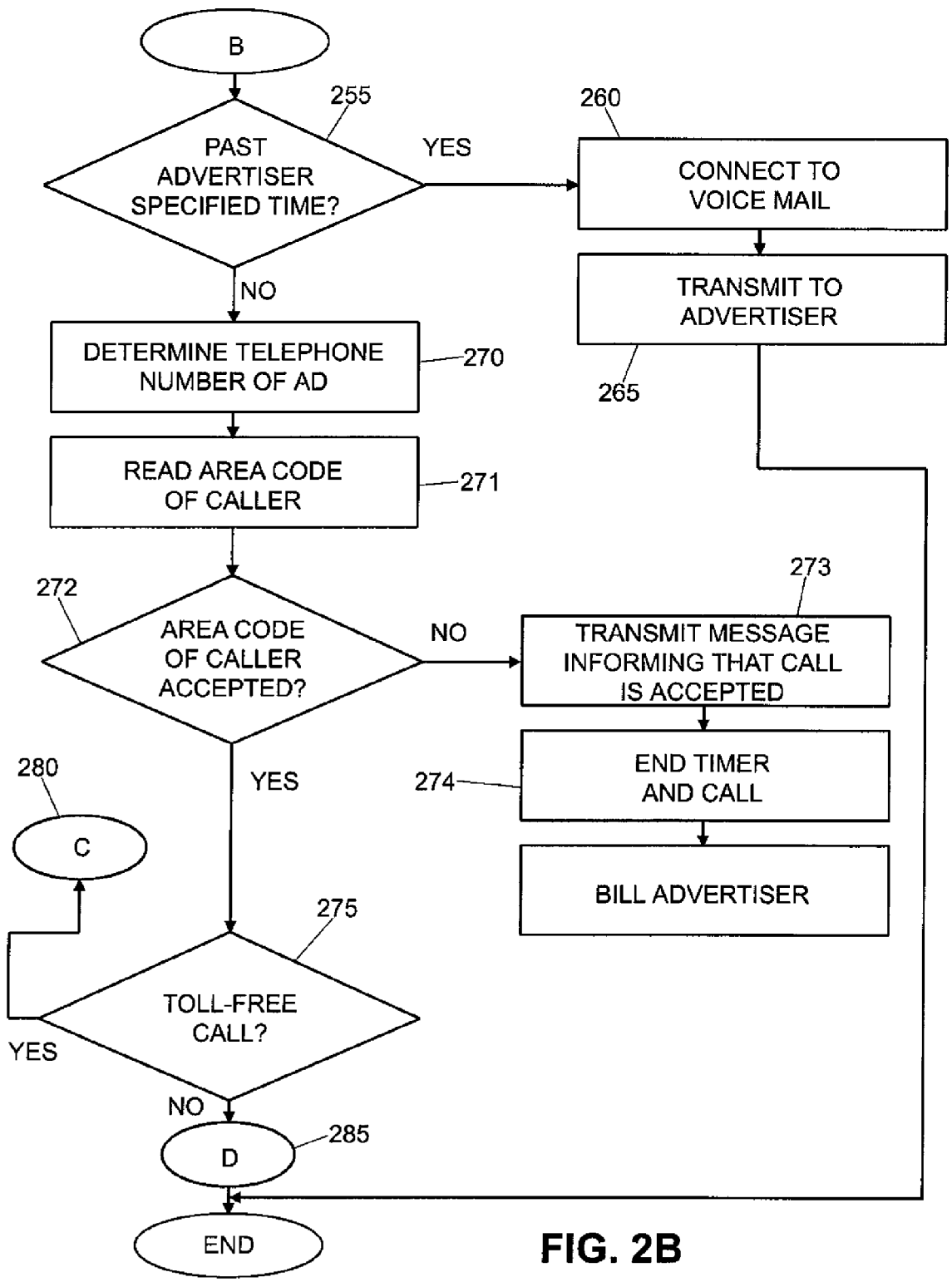
Figure 3:
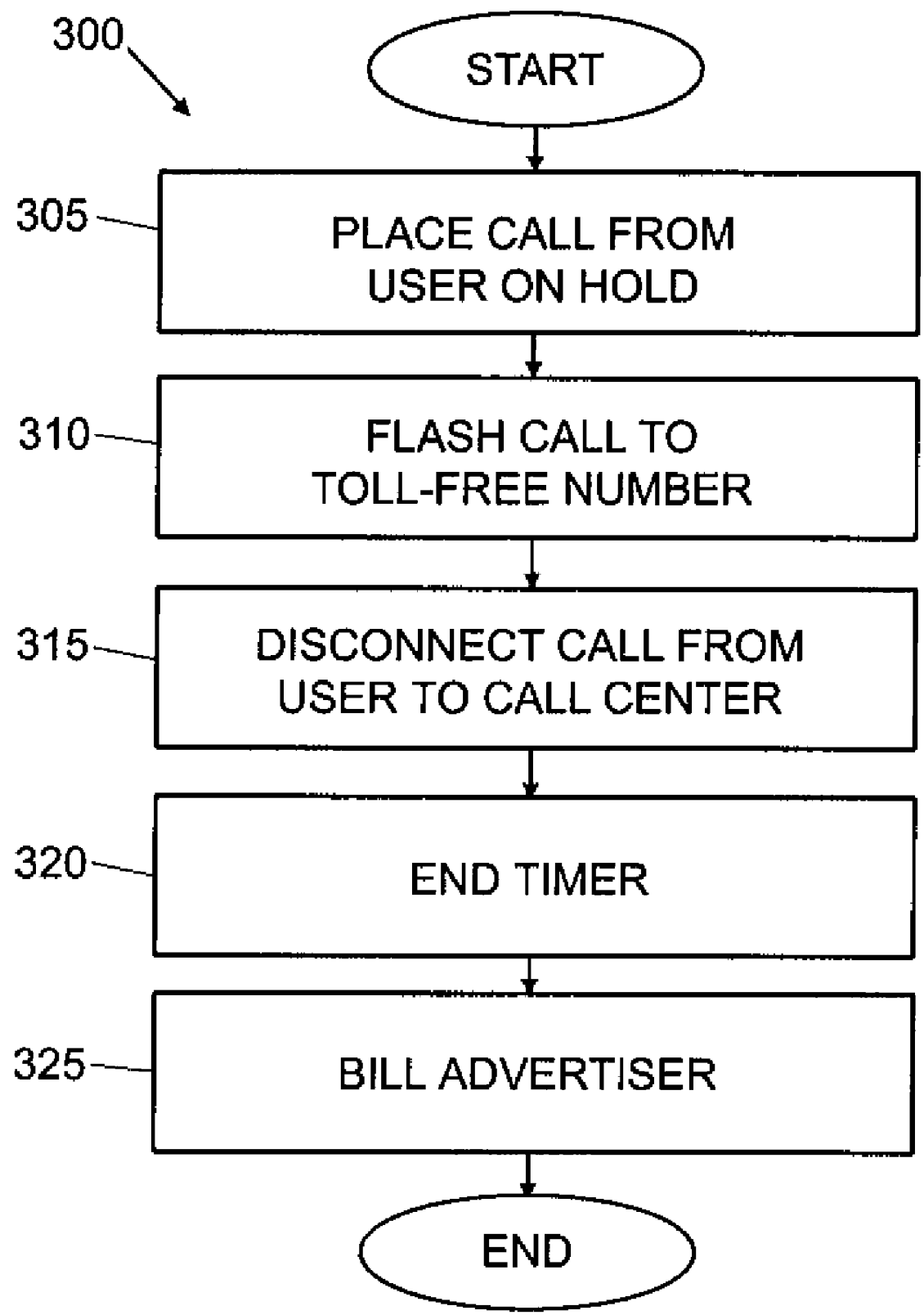
Figure 4:
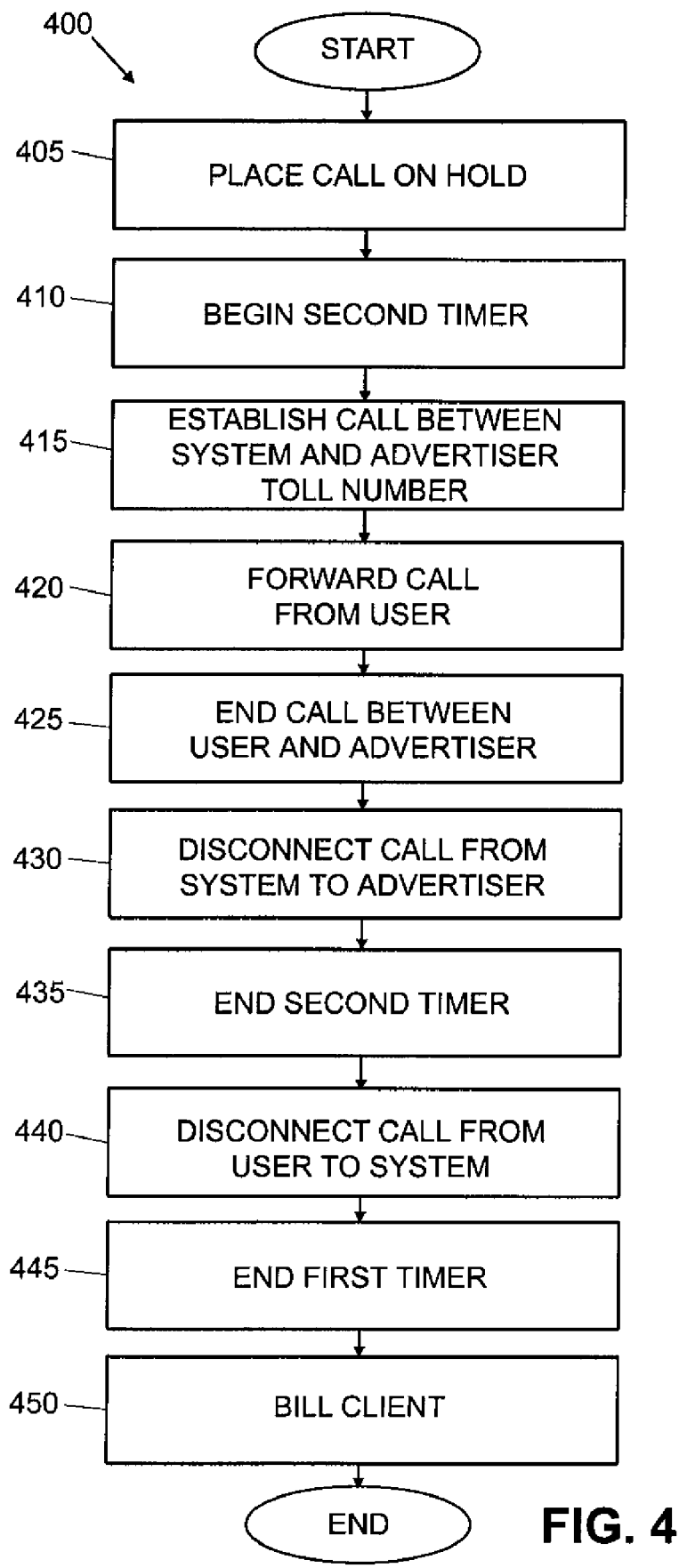
Figure 5:
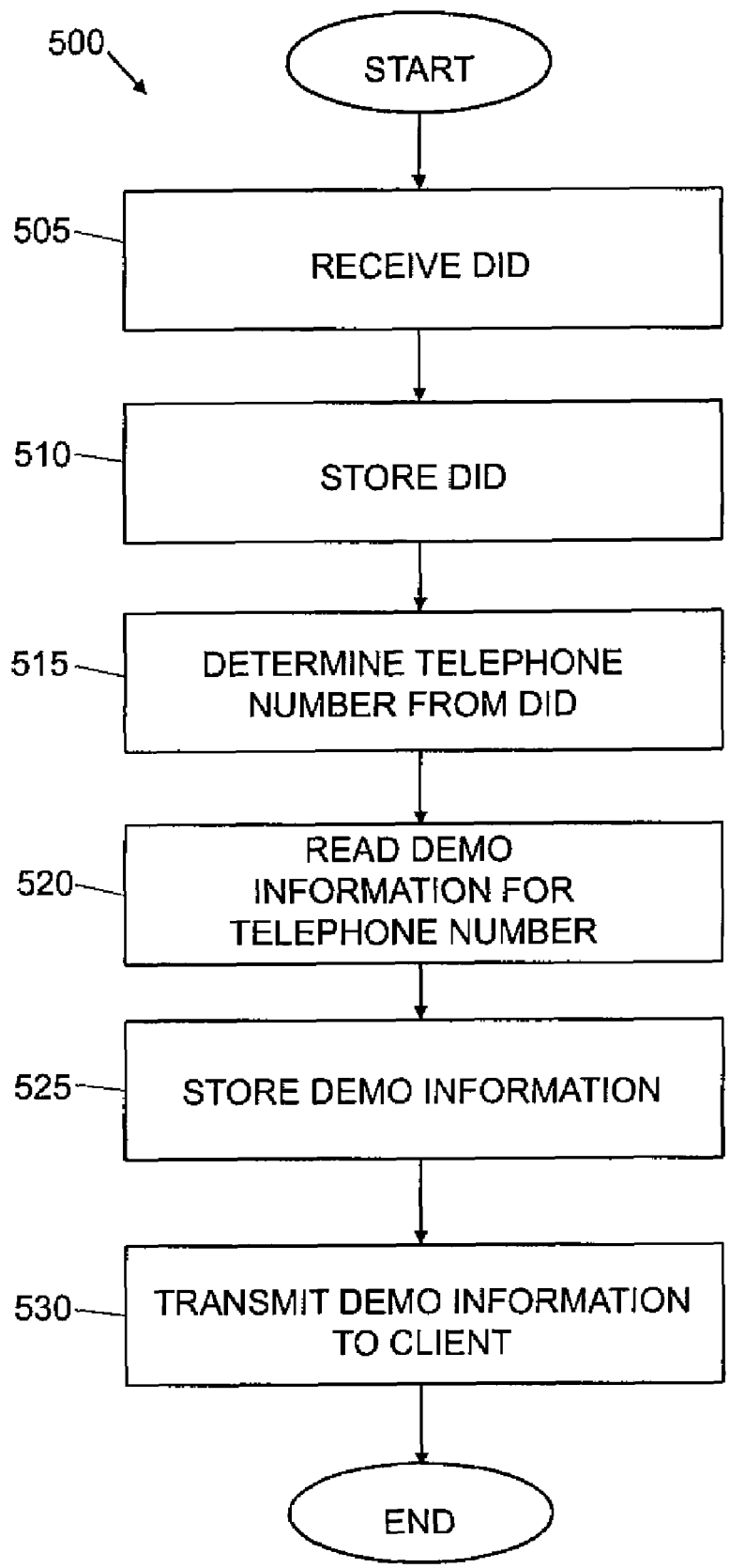
Figure 6:
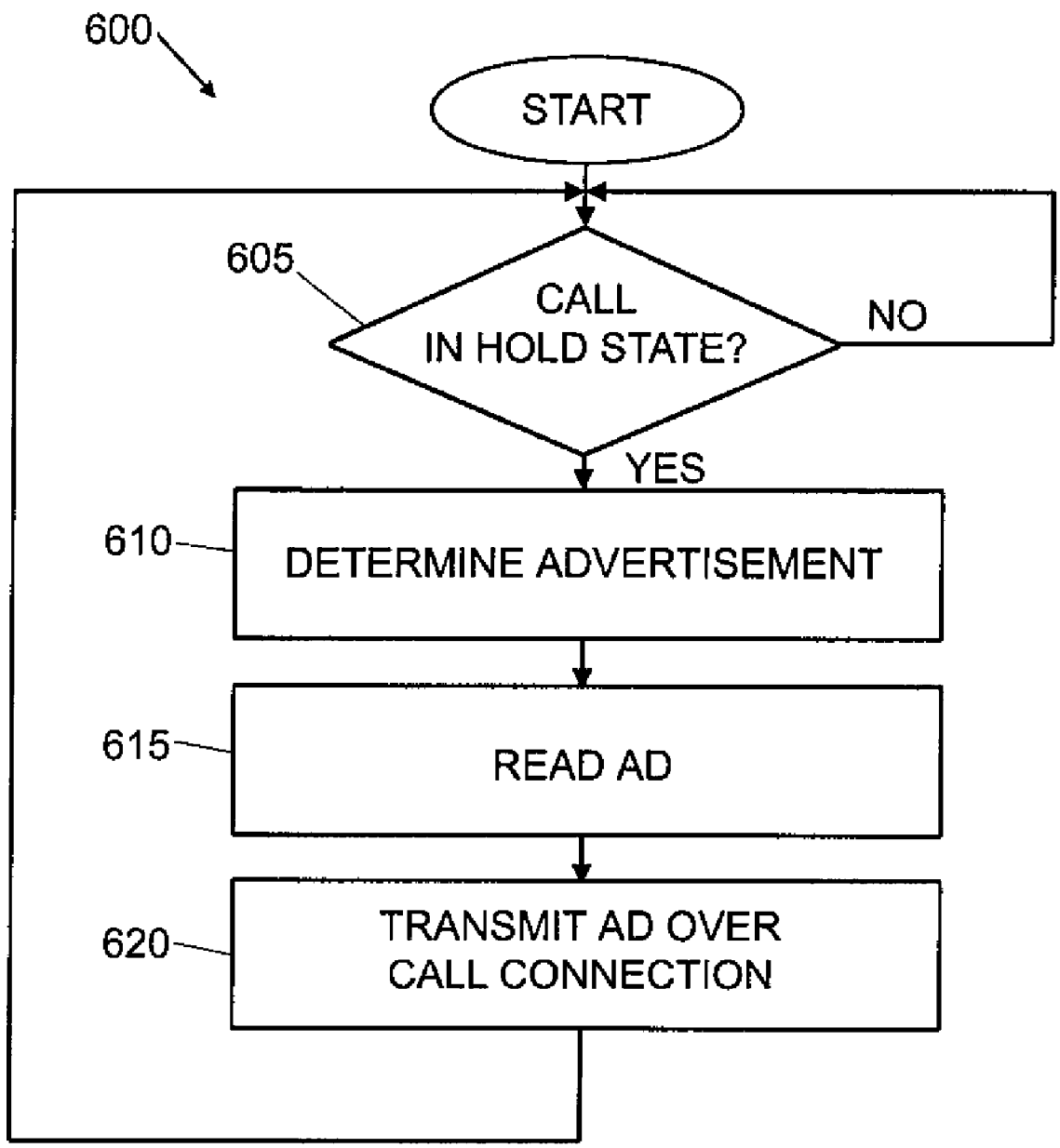

The above and other advantages and features of a system in accordance with this invention are described in the following detailed description of exemplary embodiments of this invention and are shown in the following drawings:

FIG. 1 illustrating a switching system incorporating a system in accordance with this invention;

FIG. 2 illustrating a flow diagram of an exemplary process executed by the system in accordance with this invention;

FIG. 3 illustrating a flow diagram of an exemplary process for connecting to an advertiser over a toll-free call in accordance with this invention;

FIG. 4 illustrating a flow diagram of an exemplary process for connecting to an advertiser over a toll call in accordance with this invention;

FIG. 5 illustrating a flow diagram for an exemplary process for retrieving demographic data for a user in accordance with this invention; and FIG. 6 illustrating a flow diagram for an exemplary process for transmitting an advertisement while a call is on hold in accordance with this invention.

DETAILED DESCRIPTION

This invention relates to a system for receiving a call from a user and transferring the call to an advertiser based upon a code from an advertisement input by the user. This invention is described below in a manner that allows one skilled in the art to design and use a system in accordance with this invention. When possible, like reference numerals have been used in the accompanying figures to describe the same or like elements of this invention.

FIG. 1 illustrates a switching system 110 that provides a system for handling calls in accordance with this invention. Switching system 110 may be a Personal Branch exchange (PBX) or other type of switching system that includes circuitry or software configured to perform process for providing a system in accordance with this invention. One skilled in the art will recognize only the components of switching system 110 needed to understand the invention are shown and it is left to a designer of such systems to select the proper switching system to handle the amount of calls expected to be handled by the system.

A preferred exemplary embodiment of switching system 110 includes a Central Processing Unit (CPU) 150. Read Only Memory (ROM) 155 and Random Access Memory (RAM) 160 are connected to CPU 150 via memory bus 157. ROM 155 is a non-volatile memory that stores configuration data and other data needed to operate switching system 110. RAM 160 is a non-volatile memory that stores application instructions and data needed to perform operations in switching system 110 for handling calls. RAM 160 includes stores instructions and data for call software 162, call record database manager software 164, and advertiser database management software 166. Call software 162 includes voice recognition software, call forwarding software and software for performing the functions in accordance with this invention. Call record database management software is the software that stores and reads information from a call record database 170. Advertiser management software database management software 166 stores and reads data from advertiser database 172. I/O bus 175 connects CPU 150 to memory drives that store databases 170 and 172 on a media.

Switching system 110 also includes lines 193-195 that connect to operator telephones 196-198 to connect calls to a live operator. Incoming trunk lines 180-182 connect switching system 110 to Public Switched Telephone Network (PSTN) 140 or another network for connecting telephone calls from a user to a telephone number supported by switching system 110. Outgoing trunk lines 190-192 connect switching system 110 to PSTN 140 to support outgoing calls from switching system 110. One skilled in the art will recognize that the number and configuration of trunk lines may vary with switching systems and the shown trunks are for exemplary purposes.

A user may place a telephone call to a number supported by switching system 110 using either a Plain Old Telephone System (POTS) telephone 130 or a cellular telephone 120. Preferably, the number supported by switching system 110 is a toll free number to make the call free to a user. Also, the number is also an easily remembered number to allow a user to easily use the system in accordance with this invention. POTS telephone 130 connects to a switching system in PSTN 140 via line 131. While a cellular telephone 120 connects to base station 127 via radio transmissions 125. Base station 127 then connects to a switching system in PSTN 140 via trunk 128.

This invention relates to a system that provides a common telephone number for users to call to receive more information about an advertisement that was seen or heard over a media, such as radio and/or televisions broadcasts, or signage. Furthermore, this invention provides a method for billing an advertiser for providing the service. The processes shown in FIGS. 2-6 are executed by switching system 110 to provide the service. One skilled in the art will recognize that although the processes are shown as software applications, the applications may also be performed by firmware and/or hardware configured to provide the processes.

FIG. 2 illustrates an exemplary process 200 for providing an exemplary system in accordance with this invention. Process 200 begins in step 205 by a call from a user being received and connected to the system. In response to the connection being established, demographic information is collecting in step 210 and a timer for the call is started in step 215. A preferred process for collecting demographic information in step 210 is shown in FIG. 5. Starting the timer in step 215 is important in order to determine the duration of the call for billing purposes. One skilled in the art will recognize that instead of starting a timer, a start time of the call may instead be stored in a call record in a call database.

After the call is connected, the system queries a user for a code or password received in the advertisement in step 220. Preferably, the code or password is a short and easily identified with the advertisement and/or advertiser. In step 225, the code is received. In a preferred embodiment, the user simply speaks the code and voice recognition software is used to capture the input code. In other embodiments, the code may be keyed in by the user using a keypad on the telephone of the user.

The code is then used by the system to look-up the desired advertiser in the advertiser database in step 230. In step 235, the system determines whether the desired advertiser was found by the look-up. This may include presenting the advertiser to the user and having the user verify the desired advertiser. If the desired advertiser is found, the process goes to step 250.

If the desired advertiser is not found, the system connects the call to a live operator in step 240. The operator then interacts with the user and determines the desired advertiser, and inputs the desired advertiser in step 245.

After step 235 or step 245 provides the desired advertiser, the system determines the time of day in step 250. The time of day is then compared to operating hours of the advertiser in step 255. If the time of day is not within the hours of operation, the call is connected to voice mail in step 260 and a message for the advertiser is recorded so that the advertiser may call the user at a later time. The message is then forwarded to the advertiser through e-mail or other means in step 265.

If the call occurs during the hours of operation, the telephone number for the advertiser is determined in step 270.

The system then retrieves the area code of the telephone number of the caller in step 271. The system then determines whether the advertiser accepts calls from the area code of the caller. If the advertiser does not accept calls from the area, a message stating the advertisers does not accept calls from the caller's area code is transmitted in step 272. The call is then ended and the timer is stopped in step 273. The advertiser is then billed for the call in step 274.

After step 271 or step 274, the system then determines whether the number for the advertiser is for a toll call or a toll-free call in step 275. A toll free call is a call to an 800, 888, or other such telephone number for a call center of the advertiser. A toll call is a simple call to an establishment of the advertiser. These two different types of calls require different handling and thus are billed in different manners as described below.

If the call is a toll call, the process goes to step 280 which performs process 400 as shown in FIG. 4. If the call is a toll free call, the process goes to step 285 which performs process 300 shown in FIG. 3. After steps 280 and steps 285, process 300 ends.

Process 300 is shown in FIG. 3 is an exemplary process performed by switching system 110 to "flash" a call to the system over to a toll-free number of an advertiser. In toll-free calls, a connection is not maintained between the user and the system after the call is connected to the advertiser number.

Process 300 begins in step 305 with the call between the user and the system being placed on hold. In step 310, the telephone number of the user is then "flashed" to the telephone number of the advertiser. One skilled in the art will recognize "flash" is a common function of telephone systems in which a telephonic connection is made directly between the user number and the number of the advertiser. After the call is flashed to the advertisers number, the connection supporting the call between the user and the system is disconnected in step 315. In response to the call being disconnected, the call timer is ended in step 320 or an end time is recorded if a start time was recorded.

The advertiser is then billed for the call in step 325 and process 300 ends. Billing for the call may include multiplying the time of the call by a multiplier to determine the cost of the call. The multiplier is determined from the cost of use of the system resources for maintaining the call. A record of the call, including the charge is then stored. The record may include the calling number, advertiser, length of call, start time, and/or end time of the call. The record is then used to send a bill to the advertiser at a later time.

Process 400 illustrated in FIG. 4 is a process for connecting a toll call to an advertiser. Toll calls are more expensive as the call must be forwarded. To forward a call, the connection between the system and the user must be maintained and a second connection supporting a call between the system and advertiser must be established. Both calls must then be maintained until the call from the user to the advertiser is completed. Thus, these calls require more system resources and use those resources for a longer amount of time. Therefore, a supplier of the system desires to bill an advertiser for the additional use of resources.

Process 400 begins in step 405 with placing the call from the user on hold. A second call timer is then started in step 410. As with the first timer, a start time may be recorded instead of using the timer. In step 415, a call is then established between the system and the advertiser. In step 420, the call from the user is then forwarded to the advertiser after the call to advertiser is established.

In step 425, the call between the user and advertiser ends. In response to the call ending, the system disconnects the call between the system and the advertiser in step 430. The second timer is ended or a second call end time is recorded in step 435 in response to disconnecting the call. In step 435, the call between the system and the user is disconnected. The first timer is then stopped or a first end time is recorded in step 440.

The advertiser is then billed in step 440. Billing may include multiplying the time of the first connection by a first multiplier and adding the result to the result of the time of the second time multiplied by the second multiplier. Preferably, the second multiplier is greater than the first multiplier to represent the additional resources needed to complete the call. A call record is stored. The call records includes any combination of the determined cost, start times of the two calls, end times of the two calls, the durations of the two calls, and the telephone number of the user.

In the preferred embodiment, demographic information for a caller may be collected by the system and provided to the advertiser for later use to refine the advertising by the advertiser. The demographic information may include, but is not limited to the telephone number including area code of the user; city of residence of the user; county of residence of the caller; average income in the residential area of the user; average educational level of residential area of the user; population of residential area of the user; age group demographics for the residential area of the user; racial make up of the residential area of the user; marriage statistics of the residential area of the user; average home value in the residential area; employment sectors of the residential area; and housing size of the residential area.

Process 500 illustrated in FIG. 5 is an exemplary process for collecting information for a user. One skilled in the art will recognize that an alternative embodiment may include querying the user for more specific demographic information.

Process 500 begins in step 505 with the system receiving a DID or ANI information for telephone call during call connection. In step 510, DID or other information is stored in a record of the call. The DID or other information is then used to query a database to retrieve the demographic information for the telephone number in step 515. One skilled in the art will recognize this may be completed at the time of the call. Alternatively, the system may wait and perform the look-up for all DIDs received in a certain time period at specified time intervals. The retrieved demographic information is then stored in a database with the corresponding DID in step 420. Process 500 then ends in step 425 by transmitting the demographic information to the advertiser that receives the call. This may be done by exporting the data from the database and transmitting over the network and/or printing the information on paper and sending to the advertiser.

FIG. 6 illustrates a process 600 for providing advertisements to a user over a connected call while other processes in the system are being executed and the call from the user is on hold. This allows a user to hear other advertisements of advertisers using the system that may interest the user to further promote the good and services of advertisers.

Process 600 begins in step 605 with the system determining a call is in a hold state. In response to the call being in a hold state, the system selects an advertisement in step 410. If the call is not in a hold state, process 600 repeats step 605 until a hold state is detected. The advertisement may be selected by using the input code to determine similar goods and/or services that the user may be interested in hearing. The advertisement is then read from an advertisement database by the system in step 615 and the advertisement is played for the user in step 620. After the advertisement is played, process 600 is repeated from step 605 to keep playing advertisements while the call is in a hold state.

The above describes an exemplary embodiment of this invention. It is envisioned that designers of such a system can and will design alternative embodiments that infringe on this invention as set forth in the following claims either literally or through the Doctrine of Equivalents.

What is claimed is:

1. A method for receiving a call from a user and transferring said call to a desired advertiser comprising:
   receiving said call from said user;
   receiving a code for said desired advertiser from said user;
   determining a telephone number for said desired advertiser from said code; and
   transferring said call to said telephone number;
   determining whether said telephone number is a toll free number; and
   billing said desired advertiser a first rate responsive to a determination that said telephone number is a toll free number.

2. The method of claim 1 further comprising:
   flashing said call to said toll free number.

3. The method of claim 2 further comprising:
   terminating a connection of said call to a call center.

4. The method of claim 1 wherein said billing of said desired advertiser comprises:
   determining a length of connection of said call to said call center; and
   billing said client a specified rate multiplied by said length of connection of said call to said call center.

5. The method of claim 1 wherein said billing of said desired advertiser comprises:
   billing said desired advertiser a flat fee for said call.

6. A method for receiving a call from a user and transferring said call to a desired advertiser comprising:
   receiving said call from said user;
   receiving a code for said desired advertiser from said user;
   determining a telephone number for said desired advertiser from said code; and
   transferring said call to said telephone number;
   determining whether said telephone number is for a toll call; and
   forwarding said call to said desired advertiser.

7. The method of claim 6 further comprising:
   billing said desired advertiser a toll call rate for said call.

8. The method of claim 7 wherein said step of billing comprises:
   determining a time of a connection of said call from said user; and
   determining a time for a connection of a call to said desired advertiser for forwarding said call.

9. The method of claim 8 wherein said step of billing further comprises:
   billing said desired advertiser a first rate multiplied by said time of connection for said call from user and a second rate multiplied by said time of said call to said desired advertiser.

10. The method of claim 7 wherein said toll call rate is a flat fee.

11. The method of claim 10 wherein said flat fee is determined by the cost of using two lines in a call center for an average call length.

12. A method for receiving a call from a user and transferring said call to a desired advertiser comprising:
    receiving said call from said user;
    receiving a code for said desired advertiser from said user;
    determining a telephone number for said desired advertiser from said code; and
    transferring said call to said telephone number; and
    collecting demographic information of said user making said call, wherein said collecting said demographic information comprising:
    receiving a DID for a calling telephone responsive to receiving said call;
    storing a call record with said DID;
    receiving a telephone number of said calling telephone number from said DID; and
    retrieving demographic information from a database from said telephone number.

13. A method for receiving a call from a user and transferring said call to a desired advertiser comprising:
    receiving said call from said user;
    receiving a code for said desired advertiser from said user;
    determining a telephone number for said desired advertiser from said code; and
    transferring said call to said telephone number;
    determining a time of day said call is received;
    comparing said time of day to a specified time; and
    transferring said call to a message system responsive to said time of day being past said specified time.

14. A method for receiving a call from a user and transferring said call to a desired advertiser comprising:
    receiving said call from said user;
    receiving a code for said desired advertiser from said user;
    determining a telephone number for said desired advertiser from said code; and
    transferring said call to said telephone number;
    determining that said desired advertiser cannot be determined from said code received;
    transferring said call to an operator responsive to a determination that said desired advertiser cannot be determined; and
    wherein said operator interacts with said user and transfers said call to said desired advertiser.

15. A method for receiving a call from a user and transferring said call to a desired advertiser comprising:
    receiving said call from said user;
    receiving a code for said desired advertiser from said user;
    determining a telephone number for said desired advertiser from said code; and
    transferring said call to said telephone number;
    determining an area code of the caller responsive to determining said desired advertiser;
    determining whether said desire advertiser accepts call from said area code; and
    connecting said call responsive to a determination that said advertiser accepts calls from said area code.

16. The method of claim 15 further comprising:
    transmitting a message to said call that said call was not accepted by said desired advertiser;
    ending said call; and
    billing said desired advertiser responsive to ending said call.

17. An apparatus for receiving a call from a user and transferring said call to a desired advertiser comprising:
    means for receiving said call from said user;
    means for receiving a code for said desired advertiser from said user;
    means for determining a telephone number for said desired advertiser from said code;
    means for transferring said call to said telephone number;
    means for determining whether said telephone number is a toll free number; and
    means for billing said desired advertiser a first rate responsive to a determination that said telephone number is a toll free number.

18. The apparatus of claim 17 further comprising:
means for flashing said call to said toll free number.

19. The apparatus of claim 18 further comprising:
means for terminating a connection of said call to a call center.

20. The apparatus of claim 17 wherein said means for billing of said desired advertiser comprises:
means for determining a length of connection of said call; and
means for billing said client a specified rate multiplied by said length of connection of said call to said call center.

21. The apparatus of claim 17 wherein said means for billing of said desired advertiser comprises:
means for billing said desired advertiser a flat fee for said call.

22. The apparatus of claim 21 further comprising:
means for determining whether said telephone number is for a toll call; and
means for forwarding said call to said desired advertiser.

23. The apparatus of claim 22 further comprising:
means for billing said desired advertiser a toll call rate for said call.

24. The apparatus of claim 23 wherein said means for billing comprises:
means for determining a time of a connection of said call from said user; and
means for determining a time for a connection of a call to said desired advertiser for forwarding said call.

25. The apparatus of claim 24 wherein said means for billing further comprises:
means for billing said desired advertiser a first rate multiplied by said time of connection for said call from user and a second rate multiplied by said time of said call to said desired advertiser.

26. The apparatus of claim 24 wherein said toll call rate is a flat fee.

27. The apparatus of claim 26 wherein said flat fee is determined by the cost of using two lines in a call center for an average call length.

28. The apparatus of claim 18 further comprising:
means for timing a length of a connection of said call.

29. The apparatus of claim 26 wherein said means for timing said length of said connection comprises:
means for recording a start time of said connection responsive to receiving said call; and
means for recording an end time responsive to said call being disconnected.

30. The apparatus of claim 26 wherein said means for timing said length of said connection comprises:
means for starting a timer responsive to receiving said call; and
means for stopping a timer responsive to ending said call.

31. The apparatus of claim 22 further comprising:
means for collecting demographic information of said user making said call.

32. The apparatus of claim 31 wherein said means for collecting said demographic information comprises:
means for receiving a DID for a calling telephone responsive to receiving said call;
means for storing a call record with said DID;
means for receiving a telephone number of said calling telephone number from said DID; and
means for retrieving demographic information from a database from said telephone number.

33. The apparatus of claim 31 further comprising:
means for transmitting said demographic information to said desired advertiser.

34. The apparatus of claim 30 further comprising:
means for determining a time of day said call is received;
means for comparing said time of day to a specified time; and
means for transferring said call to a message system responsive to said time of day being past said specified time.

35. The apparatus of claim 18 further comprising:
means for determining that said desired advertiser cannot be determined from said code received;
means for transferring said call to an operator responsive to a determination that said desired advertiser cannot be determined; and
wherein said operator interacts with said user and transfers said call to said desired advertiser.

36. The apparatus of claim 35 further comprising:
means for placing said received call in a hold state while connecting said call to said desired advertiser.

37. The apparatus of claim 36 further comprising:
means for transmitting advertisements over said call responsive to said call being in a hold state.

38. The apparatus of claim 35 wherein said advertisements transmitted are determined by said code provided by said users.

39. The apparatus of claim 17 further comprising:
means for determining an area code of the caller responsive to determining said desired advertiser;
means for determining whether said desire advertiser accepts call from said area code; and
means for connecting said call responsive to a determination that said advertiser accepts calls from said area code.

40. The apparatus of claim 39 further comprising:
means for transmitting a message to said call that said call was not accepted by said desired advertiser;
means for ending said call; and
means for billing said desired advertiser responsive to ending said call.

41. A product for receiving a call from a user and transferring said call to a desired advertiser comprising:
instructions for directing a processing unit to:
receive said call from said user,
receive a code for said desired advertiser from said user,
determine a telephone number for said desired advertiser from said code, and
transfer said call to said telephone number; and
a media readable by said processing unit that stores said instructions wherein said instructions further comprise:
instructions for directing said processing unit to:
determine whether said telephone number is a toll free number, and
bill said desired advertiser a first rate responsive to a determination that said telephone number is a toll free number.

42. The product of claim 41 wherein said instructions further comprise:
instructions for directing said processing unit to flash said call to said toll free number.

43. The product of claim 42 further comprise:
instructions for directing said processing unit to terminate a connection of said call to a call center.

44. The product of claim 41 wherein said instructions for billing of said desired advertiser comprise:
instructions for directing said processing unit to:
determine a length of connection of said call to said call center, and bill said client a specified rate multiplied by said length of connection of said call to said call center.

45. The product of claim 41 wherein said instructions to bill of said desired advertiser comprises:
    instructions for directing said processing unit to bill said desired advertiser a flat fee for said call.

46. The product of claim 45 wherein said instructions further comprise:
    instructions for directing said processing unit to:
        determine whether said telephone number is for a toll call, and
        forward said call to said desired advertiser.

47. The product of claim 46 wherein said instructions further comprise:
    instructions for directing said processing unit to bill said desired advertiser a toll call rate for said call.

48. The product of claim 47 wherein said instructions to bill comprise:
    instructions for directing said processing unit to:
        determine a time of a connection of said call from said user, and
        determine a time for a connection of a call to said desired advertiser for forwarding said call.

49. The product of claim 48 wherein said instructions to bill further comprise:
    instructions for directing said processing unit to:
        bill said desired advertiser a first rate multiplied by said time of connection for said call from user and a second rate multiplied by said time of said call to said desired advertiser.

50. The product of claim 47 wherein said toll call rate is a flat fee.

51. The product of claim 50 wherein said flat fee is determined by the cost of using two lines in a call center for an average call length.

52. A product for receiving a call from a user and transferring said call to a desired advertiser comprising:
    instructions for directing a processing unit to:
        receive said call from said user,
        receive a code for said desired advertiser from said user,
        determine a telephone number for said desired advertiser from said code,
        transfer said call to said telephone number; and
        collect demographic information of said user making said call, wherein said instructions for collecting said demographic information comprise:
            instructions for directing said processing unit to:
                receive a DID for a calling telephone responsive to receiving said call,
                store a call record with said DID,
                receive a telephone number of said calling telephone number from said DID; and
                retrieve demographic information from a database from said telephone number; and
    a media readable by said processing unit that stores said instructions.

53. A product for receiving a call from a user and transferring said call to a desired advertiser comprising:
    instructions for directing a processing unit to:
        receive said call from said user,
        receive a code for said desired advertiser from said user,
        determine a telephone number for said desired advertiser from said code, and
        transfer said call to said telephone number,
        determine a time of day said call is received,
        compare said time of day to a specified time, and
        transfer said call to a message system responsive to said time of day being past said specified time;
    a media readable by said processing unit that stores said instruction.

54. A product for receiving a call from a user and transferring said call to a desired advertiser comprising:
    instructions for directing a processing unit to:
        receive said call from said user,
        receive a code for said desired advertiser from said user,
        determine a telephone number for said desired advertiser from said code,
        transfer said call to said telephone number;
        determine that said desired advertiser cannot be determined from said code received, and
        transfer said call to an operator responsive to a determination that said desired advertiser cannot be determined; and
        wherein said operator interacts with said user and transfers said call to said desired advertisers; and
    a media readable by said processing unit that stores said instruction.

55. A product for receiving a call from a user and transferring said call to a desired advertiser comprising:
    instructions for directing a processing unit to:
        receive said call from said user,
        receive a code for said desired advertiser from said user,
        determine a telephone number for said desired advertiser from said code,
        transfer said call to said telephone number,
        determine an area code of the caller responsive to determining said desired advertiser,
        determine whether said desired advertiser accepts call from said area code, and
        connect said call responsive to a determination that said advertiser accepts calls from said area code; and
    a media readable by said processing unit that stores said instruction.

56. The product of claim 55 wherein said instructions further comprise:
    instructions for directing said processing unit to:
        transmit a message to said call that said call was not accepted by said desired advertiser,
        end said call, and
        bill said desired advertiser responsive to ending said call.

* * * * *